(12) United States Patent
Yeom (10) Patent No.: US 8,037,531 B2
(45) Date of Patent: Oct. 11, 2011

(54) DYNAMIC NETWORK SECURITY SYSTEM AND CONTROL METHOD THEREOF

(75) Inventor: Eung-Moon Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 967 days.

(21) Appl. No.: 11/634,992

(22) Filed: Dec. 7, 2006

(65) Prior Publication Data
US 2007/0180527 A1    Aug. 2, 2007

(30) Foreign Application Priority Data

Feb. 1, 2006   (KR) ........................ 10-2006-0009862

(51) Int. Cl.
*G06F 11/00* (2006.01)
*G06F 12/14* (2006.01)
*H04L 9/00* (2006.01)
(52) U.S. Cl. ................ 726/23; 726/22; 726/24; 726/25; 726/26; 726/27; 713/160; 713/161; 713/162; 713/163
(58) Field of Classification Search ...................... 726/23
See application file for complete search history.

(56) References Cited

U.S. PATENT DOCUMENTS

| 7,346,044 B1 * | 3/2008 | Chou et al. ..................... 370/352 |
| 2006/0078120 A1 * | 4/2006 | Mahendran et al. .......... 380/255 |

FOREIGN PATENT DOCUMENTS
WO    WO 2005/109797    11/2005

OTHER PUBLICATIONS

Korean Office Action corresponding to Korean Patent Application No. 10-2006-0009862, issued on Nov. 22, 2006.

* cited by examiner

*Primary Examiner* — Longbit Chai
(74) *Attorney, Agent, or Firm* — H.C. Park & Associates, PLC (57) ABSTRACT

A dynamic network security system and a control method thereof in a router where an Intrusion Detection System (IDS) and a Voice over Internet Protocol Application Level Gateway (VoIP ALG) are integrated, system including: a VoIP ALG module for acquiring VoIP IP/port information of a counterpart unit in use for determining whether or not to perform intrusion detection on a packet received via VoIP signaling with the counterpart unit; an intrusion detection module for comparing the received packet with a preset intrusion detection log entry to perform intrusion detection on the received packet, and based on a result of the intrusion detection, determining whether or not to allow passage of the received packet; and an IP/port check module for checking VoIP IP/port information of the received packet according to the VoIP IP/port information of the counterpart unit provided from the VoIP ALG module to determine whether or not to perform the intrusion detection, and providing result information on the determination whether or not to perform the intrusion detection to the intrusion detection module.

12 Claims, 4 Drawing Sheets

| Rules | | Rules | | Rules | |
|---|---|---|---|---|---|
| ☒ | local.rules | ☒ | bad-traffic.rules | ☒ | exploit.rules |
| ☒ | scan.rules | ☒ | finger.rules | ☒ | ftp.rules |
| ☒ | telnet.rules | ☒ | rpc.rules | ☒ | reservices.rules |
| ☒ | dos.rules | ☒ | ddos.rules | ☒ | dns.rules |
| ☒ | tftp.rules | ☒ | web-cgi.rules | ☒ | web-coldfusion.rules |
| ☒ | web-iis.rules | ☒ | web-frontpage.rules | ☒ | web-misc.rules |
| ☒ | web-client.rules | ☒ | web-php.rules | ☒ | sql.rules |
| ☒ | x11.rules | ☒ | icmp.rules | ☒ | netbios.rules |
| ☒ | misc.rules | ☒ | attack-frsponses.rules | ☒ | oracle.rules |
| ☒ | mysql.rules | ☒ | snmp.rules | ☒ | smtp.rules |
| ☒ | imap.rules | ☒ | pop2.rules | ☒ | pop3.rules |
| ☐ | nntp.rules | ☐ | other-ids.rules | ☐ | web-attacks.rules |
| ☐ | backdoor.rules | ☐ | shellcode.rules | ☐ | policy.rules |
| ☒ | porn.rules | ☐ | info.rules | ☐ | icmp-info.rules |
| ☒ | virus.rules | ☐ | chat.rules | ☐ | multimedia.rules |
| ☐ | p2p.rules | ☒ | experimental.rules | | |
| ··· | | ··· | | ··· | |

FIG. 4

DYNAMIC NETWORK SECURITY SYSTEM AND CONTROL METHOD THEREOF

CLAIM OF PRIORITY

This application makes reference to, incorporates the same herein, and claims all benefits accruing under 35 U.S.C. §119 from an application for SYSTEM AND METHOD FOR DYNAMIC NETWORK SECURITY earlier filed in the Korean Intellectual Property Office on the 1 Feb. 2006 and there duly assigned Ser. No. 10-2006-0009862.

BACKGROUND OF THE INVENTION

1. Field of the Invention

The present invention relates to a dynamic network security system and a control method thereof.

2. Description of the Related Art

Security is one of the most important problems in networks nowadays. Various systems and methods are being used for network security. A firewall is one type of network security system. The firewall is located at a point where its organization is connected to a network to protect the organization from external attacks. In addition, the firewall is used to enable a host in the organization to access only specific services in the Internet. In case of network access without the firewall, all hosts are under the risk of external attacks.

The firewall is constructed by several methods, and in IP technology, packet filtering is generally used.

Packet filtering is a method of making a judgment on the passage of a packet. That is, according to packet filtering, a firewall is set to allow passage to a specific packet in order to avoid any external attack. The firewall of the packet filtering, upon receiving a packet, makes a judgment on the passage of the packet, and based on the judgment, allows or prohibits passage of the received packet. The firewall judges whether or not to allow passage of the packet based on several pieces of information of the packet, such as IP address/port number information.

The firewall stores a predefined firewall rule list, and operates according to the firewall rule list in order to judge whether or not to allow passage of received packets. Upon receiving a packet, the firewall judges whether or not to allow passage of the packet with reference to the firewall rule list, and based on a judgment result, allows or prohibits passage of the packet. Therefore, if a packet is to pass through the firewall, it must be registered previously in the firewall rule list. The firewall rule list can include packet information, such as IP address, port number and protocol.

Current networks support Voice over Internet Protocol (VoIP) packets, and the quantity of VoIP packets in use is increasing gradually. The VoIP packets, however, use dynamic IP addresses and ports. The firewall acts on a packet using a dynamic Internet Protocol (IP) and port as follows.

If a received packet does not use a well-known port, there is no way to judge whether or not to apply the firewall to dynamic IP addresses and ports. Therefore, the IP address and port ranges to be used must be set previously in the firewall rule list. That is, the IP address and port must be set beforehand so that packets having a corresponding IP address and port can pass through the firewall.

Furthermore, the firewall is conditional to VoIP services in a network environment that uses a Private IP address. A VoIP service needs an Application Level Gateway (ALG) in order to use a private IP address, and must use a public IP address if ALG is not available. Of course, VoIP services using a private IP address and a public IP address need corresponding IP addresses, ports and so on opened in the firewall.

If packets are using dynamic IP addresses and ports, a predetermined IP address and port are always excluded from the application of the firewall rule. This prevents reliable firewall construction.

In a security system having a router module where an Intrusion Detection System (IDS) and an ALG are integrated, the IDS compares an IP packet received via an IP network with about 3,000 pattern rules previously set and stored through pattern/byte matching, and thereby performs intrusion detection on the received IP packet.

If the intrusion detection is performed on all of the received IP packets by comparing each IP packet with the preset 3,000 pattern rules, the intrusion detection by the IDS can cause a transmission delay, thereby degrading the Quality of Service (QoS) of VoIP packets which request real-time processing.

Furthermore, the pattern matching by the IDS also increases the load of the router module, which disadvantageously acts as a factor to degrade the performance of the router module.

SUMMARY OF THE INVENTION

The present invention has been made to solve the foregoing problems of the prior art and it is therefore an object of certain embodiments of the present invention is to provide a dynamic network security system and a control method thereof, by which in a router where an Intrusion Detection System (IDS) and a Voice over Internet Protocol Application Level Gateway (VoIP ALG) are integrated, the VoIP ALG parses VoIP IP/port information acquired through VoIP signaling to acquire necessary RTP IP/port information, shares acquired RTP IP/port information with the IDS through interlocking so that the IDS performs differential RTP packet pattern matching on a VoIP packet in order to ensure Quality of Service (QoS) of the VoIP packet.

Another object of certain embodiments of the present invention is to provide a dynamic network security system and a control method thereof, by which an IDS sets a pattern check rule and gives flexibility to the set pattern check rule in order to skip intrusion detection checking or facilitate check packet quantity selectivity (per a predetermined period).

Yet another object of certain embodiments of the present invention is to provide a dynamic network security system and a control method thereof, by which an IDS performs packet pattern matching differentially in order to reduce system load than conventional pattern matching applied to all packets.

According to one aspect of the present invention for realizing the above objects, an integrated switching system is provided, the system including: a switch and a router, the router including: an intrusion detection module adapted to store communication information of a counterpart unit in use for application or skipping of intrusion detection and to check communication information of a received packet according to the communication information of the counterpart unit to determine whether or not to perform the intrusion detection; and a signaling processor adapted to provide the communication information of the counterpart unit to the intrusion detection module, the communication information of the counterpart unit being acquired via signaling with the counterpart unit.

The signaling processor is preferably adapted to acquire communication information of an external counterpart unit via Voice over Internet Protocol (VoIP) signaling with the counterpart unit and to provide the acquired communication information to the intrusion detection module.

The communication information of the counterpart unit preferably includes IP/port information of the counterpart unit performing VoIP signaling with a VoIP Application Level Gateway (ALG).

The VoIP ALG is preferably adapted to provide the acquired IP/port information to the intrusion detection module using a predefined protocol. The predefined protocol preferably includes an Inter Processor Communication (IPC) protocol.

The VoIP ALG is preferably adapted to provide a message including the IP/port information of the counterpart unit to the intrusion detection module for application of the intrusion detection upon completion of VoIP communication with the counterpart unit.

The intrusion detection module preferably includes: an intrusion detector adapted to compare the received packet with a preset intrusion detection log entry to perform intrusion detection on the packet, and to determine whether or not to allow passage of the received packet based on a result of the intrusion detection; and an IP/port check module adapted to check VoIP IP/port information of the received packet according to the VoIP IP/port information provided from the VoIP ALG to determine whether or not to perform the intrusion detection, and to provide result information of the determination to the intrusion detector.

The IP/port check module preferably includes an IP/port memory adapted to store the VoIP IP/port information of the counterpart unit for application or skipping of the intrusion detection provided by the VoIP ALG.

According to another aspect of the present invention for realizing the above objects, a router of an integrated switching system is provided, the router including: a Voice over Internet Protocol Application Level Gateway (VoIP ALG) module adapted to acquire VoIP IP/port information of a counterpart unit in use for determining whether or not to perform intrusion detection on a packet received via VoIP signaling with the counterpart unit; an intrusion detection module adapted to compare the received packet with a preset intrusion detection log entry to perform intrusion detection on the received packet and to determine whether or not to allow passage of the received packet based on a result of the intrusion detection; and an IP/port check module adapted to check VoIP IP/port information of the received packet according to the VoIP IP/port information of the counterpart unit provided from the VoIP ALG module to determine whether or not to perform the intrusion detection, and to provide result information on the determination whether or not to perform the intrusion detection to the intrusion detection module.

The IP/port check module is preferably adapted to store the VoIP IP/port information of the counterpart unit in use for application or skipping of the intrusion detection, the VoIP IP/port information being provided by the VoIP ALG module.

The VoIP ALG is preferably adapted to provide a message including the IP/port information of the counterpart unit for application of the intrusion detection to the IP/port check module upon completion of VoIP communication with the counterpart unit.

According to still another aspect of the present invention for realizing the above objects, a method of processing a received packet in a router including a Voice over Internet Protocol Application Level Gateway (VoIP ALG) and an Intrusion Detection System (IDS) to perform intrusion detection is provided, the method including: the VoIP ALG of the router acquiring VoIP IP/port information of a counterpart unit through signaling therewith and providing the acquired VoIP IP/port information to the IDS; the IDS storing the VoIP IP/port information provided by the VoIP ALG; and the IDS skipping the intrusion detection on a received packet having VoIP IP/port information equal to the stored VoIP IP/port information and allowing passage of the received packet.

The VoIP ALG is preferably adapted to provide the acquired IP/port information to the IDS according to a predefined protocol. The predefined protocol preferably includes an Inter Processor Communication (IPC) protocol.

The method preferably further includes the VoIP ALG providing the VoIP IP/port information to the IDS for application of the intrusion detection upon completion of VoIP communication with the counterpart unit.

The present invention as described below can be realized by using IP/port information. That is, according to certain embodiments of the present invention, if it has been determined that receipt of a VoIP packet starts via a specific port, packets received via the port after that are allowed to pass through without packet pattern matching. After that, when it has been determined that receipt of VoIP packets via the port has been completed, packet pattern matching is carried out on packets received via the port to perform intrusion detection.

According to the present invention, a VoIP ALG makes a determination as to whether or not to allow passage to the packet without pattern matching. The VoIP ALG, through signaling with a counterpart unit to communicate therewith, acquires communication information through which a packet is to be received, and provides the acquired communication information to the IDS through interlocking. The IDS determines whether or not to perform intrusion detection on a received packet through pattern matching according to the IP/port information provided from the VoIP ALG, in which an attack signal from the received packet has been detected.

Upon receiving the IP/port information from the VoIP ALG, the IDS allows passage of a packet received via corresponding IP/port without performing pattern matching thereon. The IDS has an ACL for storing the IP/port information as a basis for judgment on passage of the received packet, and if the packet should be prohibited from passage, stores information on packet rule types for pattern matching of the packet. The ACL is updated whenever communication is received from the VoIP ALG through interlocking.

As the VoIP ALG acquires the IP/port information through signaling and then provides the IP/port information to the IDS, it updates the ACL in real-time by reflecting the IP/port information. Referring to the ACL that is updated in real-time, the IDS makes a determination on passage or packet matching of a received packet, and according to a result of the determination, allows the received packet to pass or performs pattern matching thereof.

If it has been determined that VoIP communication via the port has been completed, the VoIP ALG of the router provides information including an instruction signal to the IDS, instructing the IDS to prohibit passage of a packet received through the port with corresponding IP/port information. That is, when receipt of VoIP packets through the port with corresponding IP/port information is completed, the VoIP ALG prohibits passage of packets received through the port and performs intrusion detection through pattern matching. The VoIP ALG can acquire such communication completion-related information through signaling with a counterpart unit which has been communicating with the VoIP ALG.

When the IDS is provided with passage prohibition information from the VoIP ALG, it updates corresponding information according to the provided information (e.g., VoIP IP/port information). Then, the IDS determines whether or not to perform pattern matching of a received packet according to the updated information. That is, although packets received through a specific port have been exempted from packet pattern matching, the passage prohibition information causes the IDS to perform packet pattern matching to a packet received through the packet, and according to a result of such matching, allows passage of the received packet.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

The present invention is described more fully hereinafter with reference to the accompanying drawings, in which exemplary embodiments of a dynamic network security system and control method thereof according to embodiments of the present invention are shown. In the following description, well-known functions or constructions have not been described in detail since they would unnecessarily obscure the understanding of the present invention.

In the following illustrative embodiments of the invention, the description assumes that the Internet Protocol (IP) packets request real-time processing, namely, that Voice over Internet Protocol (VoIP) packets are used as an example of the IP packets requesting real-time processing. However, this is illustrative only. The present invention is not limited thereto.

Figure 1:
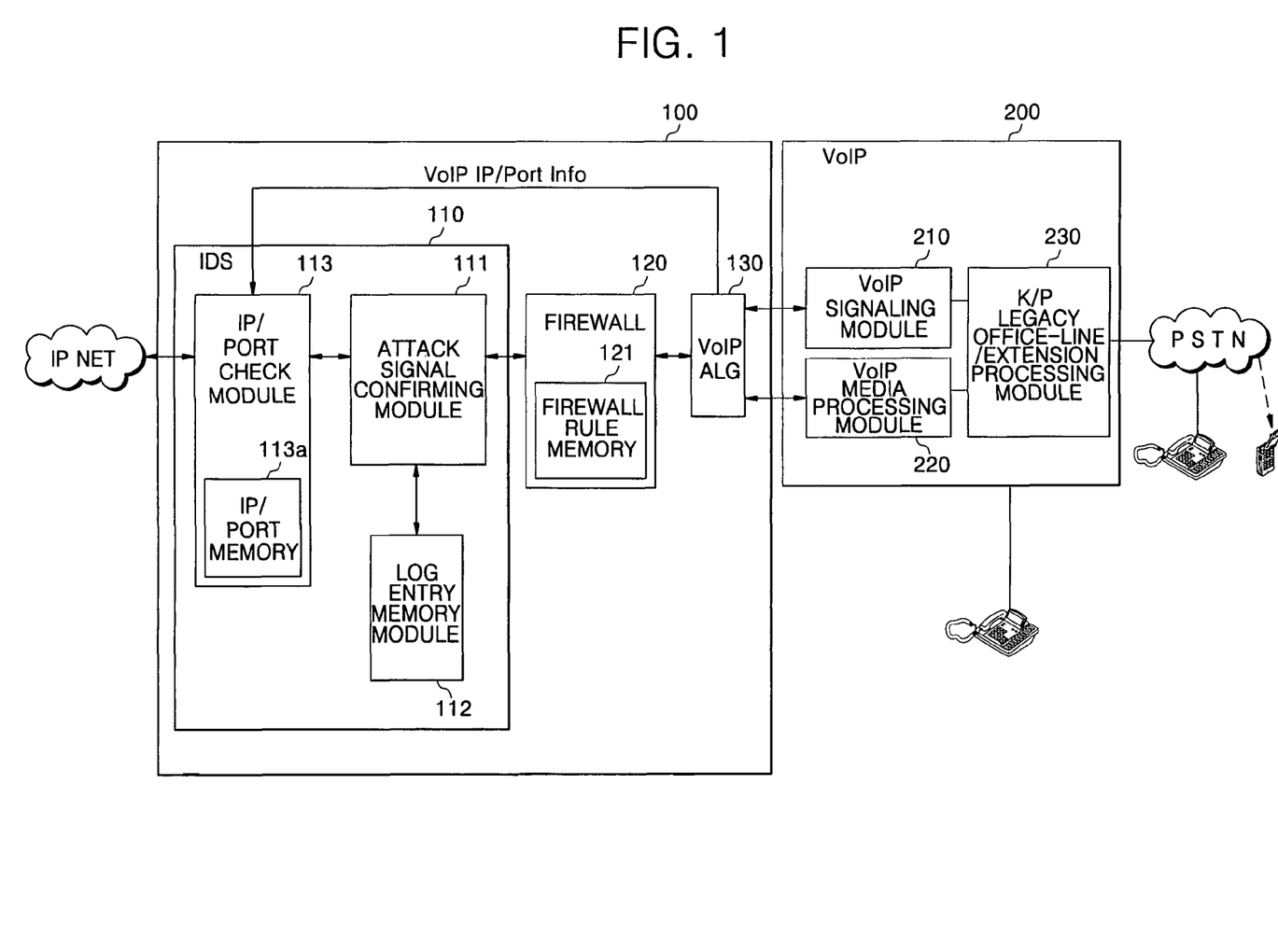
FIG. 1 is a block diagram of a dynamic network security system according to an embodiment of the present invention.

FIG. 1 is a block diagram of a dynamic network security system according to an embodiment of the present invention.

The dynamic network security system of FIG. 1 includes a router 100 and a VoIP switch 200.

The VoIP switch 200 includes a VoIP signaling module 210, a VoIP media processing module 220 and an exchange (or K/P legacy office-line/extension processing) module 230.

The router 100 includes an Intrusion Detection System 110, a firewall 120 and a Voice over Internet Protocol Application Level Gateway (VoIP ALG) 130. The firewall 120 includes a firewall rule memory or ACL 121.

The Intrusion Detection System (IDS) 110 of the router 100 includes an attack signal confirming module 111, a log entry memory module 112 and an IP/port check module 113 having an IP/port memory 113a.

The VoIP switch 200 performs a switching process, particularly, to transmit received packets to requested destinations according to information in the packets. The VoIP signaling module 210 performs a signaling process for a VoIP call.

Furthermore, the VoIP signaling module 210 can judge the type of a corresponding packet according to header information of the received packets.

The VoIP media processing module 220 performs a media transcoding process for a VoIP call.

The exchanging module 230 performs an exchange process for packets.

Detailed functions of the VoIP switch 200 correspond to well-known techniques and have therefore not been described herein.

As shown in FIG. 1, the VoIP ALG 130 of the router 100 parses a received VoIP packet, performs VoIP through signaling with a counterpart unit, in case of a NAT environment, regenerates corresponding IP/port information of a VoIP signaling message into a signaling message conforming to NAT to process a seamless VoIP service, and provides corresponding public IP/port information acquired through the VoIP signaling to the IDS 110 to share the corresponding information.

Under a public IP environment, the VoIP ALG 130 parses only VoIP IP/port to provide to the IDS 110, thereby sharing corresponding IP/port information.

The attack signal confirming module 111 of the IDS 110 performs pattern/byte code matching according to pattern/byte code rules stored in the log entry memory module 112 in order to confirm whether or not a received packet has intruded. The attack signal confirming module 111 does not apply pattern/byte code matching to all of the received packets to perform intrusion detection, but determines whether or not to apply pattern/byte code matching according to a judgment result on intrusion detection by the IP/port check module 113. Detailed functions thereof will be described later.

Figure 2:
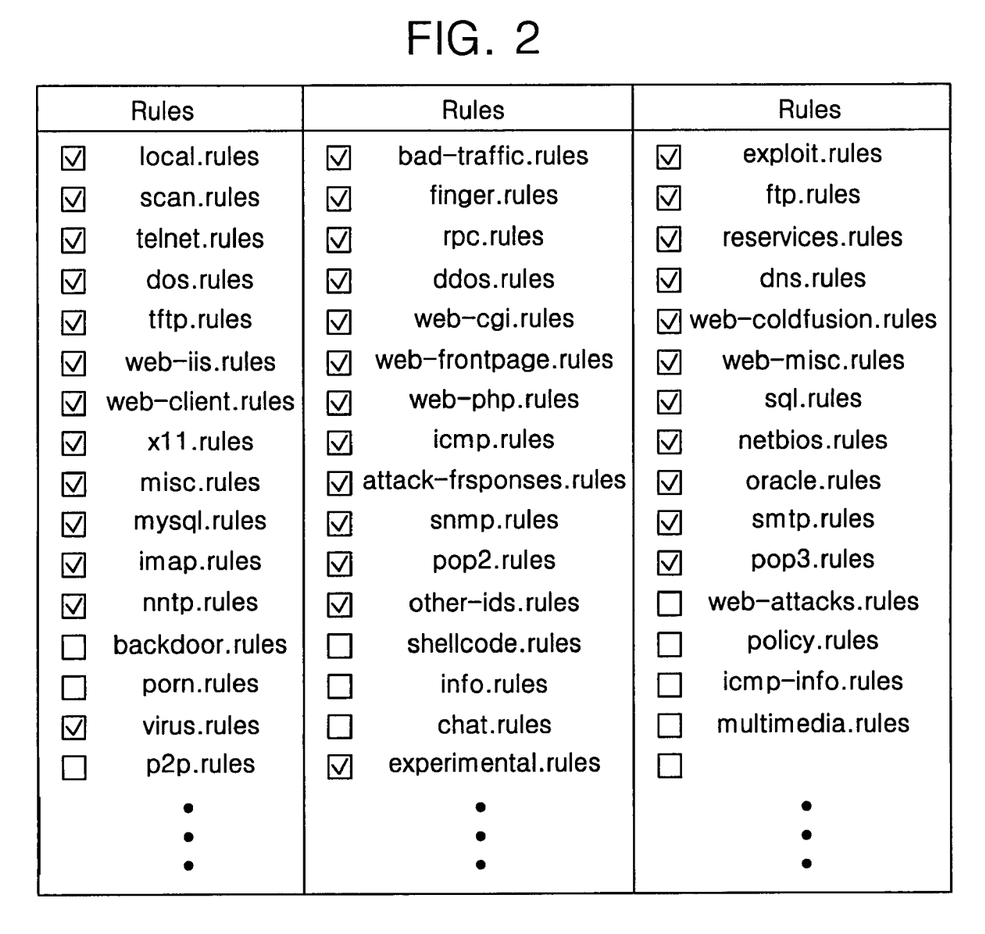
FIG. 2 is a table of rule types of Internet Protocol (IP) pattern/byte code information stored in an IP/port memory of FIG. 1.

The log entry memory module 112 stores pattern/byte code rule information types of packets to be used in the attack signal confirming module 111 to perform intrusion detection on received IP packets. The pattern/byte code rule information stored in the log entry memory module 112 has about 3,000 rule information types, some of which are shown in FIG. 2.

The IP/port check module 113 of the IDS 110 is interlocked with the VoIP ALG 130 to compare dynamic IP/port information provided from the VoIP ALG 130 with an input IP packet to determine whether or not to perform intrusion detection.

That is, the IP/port check module 113 of the IDS 110 receives VoIP IP/port information of a counterpart unit, which is acquired by the VoIP ALG 130 through the VoIP signaling, stores the received VoIP IP/port information in the IP/port memory 113a, and compares the IP/port information stored in the IP/port memory 113a with IP/port information of a packet source unit received via an IP network.

When compared, if a received packet has the same information as the IP/port information stored in the IP/port memory 113a, the IP/port check module 113 provides the received packet to the attack signal confirming module 111. When sending the received packet to the attack signal confirming module 111, the IP/port check module 113 provides a message that requests exemption of intrusion detection in order not to perform pattern/byte code matching. As a result, the attack signal confirming module 111 provides the packet sent from the IP/port check module 113 to the firewall 120 without intrusion detection performed on the packet.

The firewall 120 includes the firewall rule memory 121 for storing firewall rules for determining the passage of a received packet, and compares source IP/port information of the received packet with IP/port information stored in the firewall rule memory 121.

When compared, if the same IP/port information is stored in the firewall rule memory 121, the firewall 120 allows passage of the received packet to the VoIP switch 200. Otherwise, the firewall 120 prohibits the received packet from passing to the VoIP switch 200.

Figure 3:
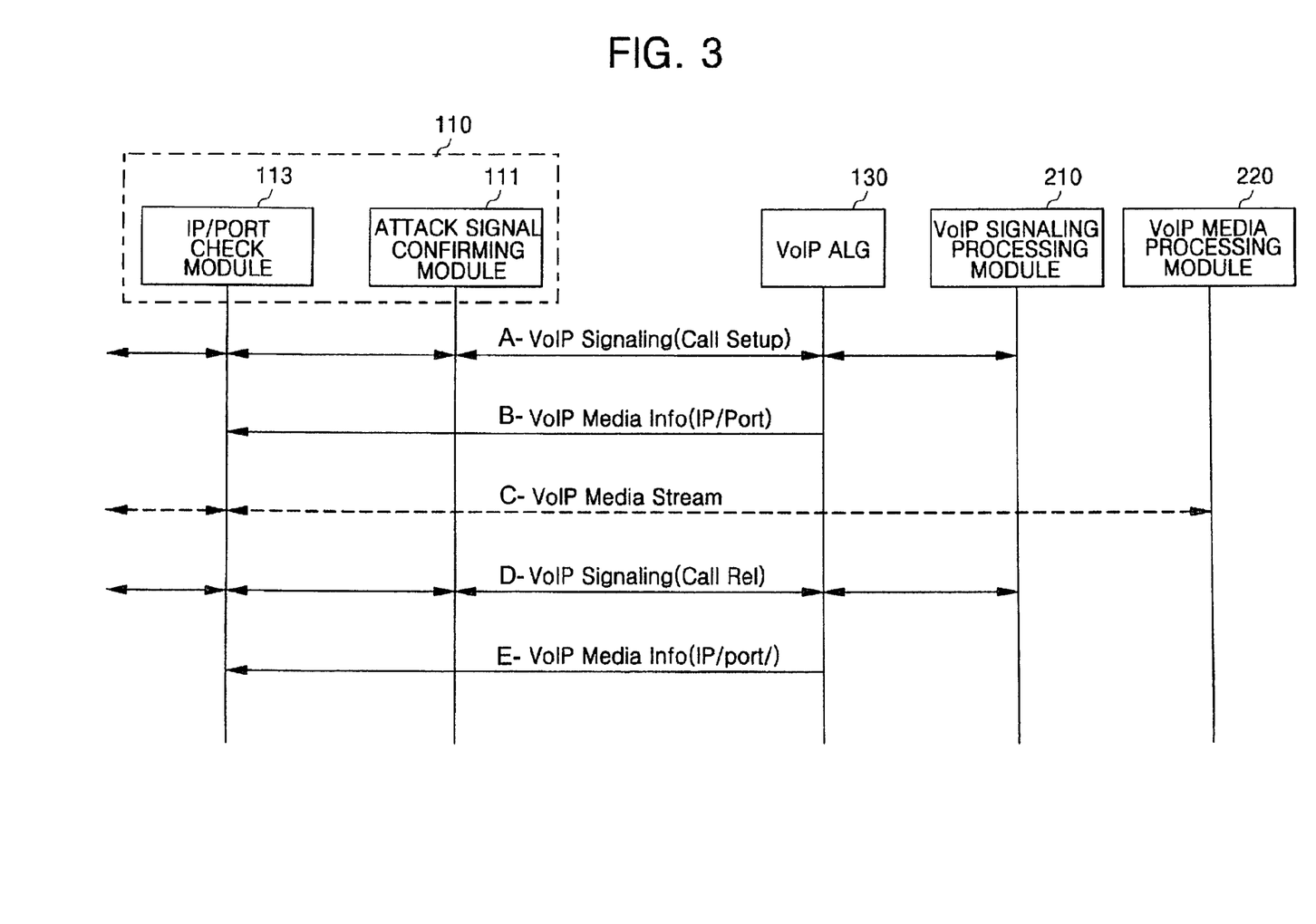
FIG. 3 is a signal flow diagram of packet security cooperative processing between Voice over Internet Protocol Application Level Gateway (VoIP ALG) and Intrusion Detection System (IDS) in a router according to an embodiment of the present invention.

FIG. 3 is a signal flow diagram of packet security cooperative processing between a VoIP ALG and IDS in a router according to an embodiment of the present invention.

In FIG. 3, A indicates a VoIP signaling process for a VoIP call setup. First, the VoIP ALG 130 can perform VoIP signaling with a counterpart unit of a corresponding VoIP call via an IP network, and use a VoIP signaling process signal (see A) using a VoIP call setup message. VoIP signaling in the VoIP ALG 130 begins with a well-known port (e.g., H.323 TCP 1719,1720 Port and SIP UDP 5060 Port).

When the VoIP ALG 130 checks the IP/port of a counterpart unit via VoIP signaling, a well-known port (e.g., H.323 TCP 1719,1720 Port and SIP UDP 5060 Port) is previously released in case of an ingress process by the IP/port check module 113 of the IDS 110 so that VoIP signaling using the well-known port can be processed by the VoIP ALG 130.

As a result, the VoIP ALG 130 acquires IP/port information of the counterpart unit according to the VoIP signaling using the VoIP call setup message.

In FIG. 3, B indicates a process of instructing the IP/port check module 113 of the IDS 110 to allow passage of a packet to the switch 200 if it is received from a source unit having the IP/port information acquired through the VoIP signaling. When the VoIP ALG 130 regenerates a signaling payload according to NAT/PT rules of a VoIP call setup message (e.g., Q931 "Setup" message or SIP "INVITE" message) after signaling scanning with a counterpart unit, RTP media information or IP/port information is acquired and then transmitted to the IP/port check module 113 of the IDS 110. This notifies the IP/port check module 113 of local VoIP service information.

That is, the VoIP ALG 130 parses the VoIP signaling to transmit UDP RTP packet public IP/port information of a remote side and UDP RTP packet public IP/port information of a local side to the IP/port check module 113 of the IDS 110.

Upon receiving the IP/port information for intrusion detection provided from the VoIP ALG 130, the IP/port check module 113 of the IDS 110 sets the received IP/port information to be exempted from intrusion detection. That is, the IP/port information for intrusion detection of a received packet is updated in the IP/port memory 113*a* for storage and management.

Therefore, as shown by C in FIG. 3, the IP/port check module 113 of the IDS 110 checks IP/port information stored in the IP/port memory 113*a* in order to relieve a VoIP media stream packet from intrusion detection by the attack signal confirming module 111 when the packet is received from a source unit having corresponding IP/port information. That is, the IP/port check module 113 checks IP/port information stored in the IP/port memory 113*a* in order to pass a packet to the firewall 120 with no intrusion detection performed on the packet if the packet is received from a source unit having corresponding IP/port information.

When a VoIP call with the source unit having corresponding IP/port information is completed, a VoIP Call Release message (e.g., Q931 "Disconnect" message or SIP "BYE" message) is received (indicated by D in FIG. 3). Then, the VoIP ALG 130 forwards corresponding RTP IP/port information of the Call Release message to the IP/port check module 113 of the IDS 110 (indicated by E in FIG. 3).

Therefore, the IP/port check module 113 of the IDS 110 cancels corresponding RTP IP/port information of the received Call Release message from the IP/port memory 113*a*. Since then, the attack confirming module 111 performs intrusion detection on a received packet having corresponding information.

As a result, when the VoIP Call is completed, the VoIP ALG 130 forwards corresponding IP/port information to the IP/port check module 113 of the IDS 110 so that such IP/port information is exempted from those subject to differential intrusion detection. Therefore, dynamic VoIP IP/port information is shared in the router 100 where the IDS 110 and the VoIP ALG 130 are integrated, and thus intrusion detection is performed differentially to improve VoIP QoS and lower system load thereby enhancing system performance.

In the meantime, as a unique function, the VoIP ALG 130 processes corresponding IP/port conversion of the VoIP signaling message according to the NAT Table (not shown) of the firewall 120 in the case of NAT. When not using an intranet VoIP/port as a private IP/port, the IP of the VoIP signaling module 210 of the VoIP switch 200 is used as public IP/port, in which the VoIP ALG 130 acquires only an IP/port for a necessary UDP RTP packet through signaling message parsing and shares the acquired IP/port with the VoIP ALG 130.

The following is a description of an intrusion detection process by the afore-described dynamic network security system in accordance with an embodiment of the present invention.

As shown in FIG. 1, when an IP packet is received in the IP network, the IDS 110 compares the received IP packet with about 3,000 patterns using pattern/byte matching of an intrusion detection packet in order to detect an intrusion, if any. The IDS 110 does not compare all of the received IP packets with intrusion detection rules stored in the log entry or the log entry memory module 112. For packets corresponding to VoIP IP/port information, the IDS 110 skips intrusion detection on those packets and forwards them to the firewall.

VoIP IP/port information can be acquired through the parsing of the VoIP signaling message by the VoIP ALG 130. That is, the VoIP ALG 130 acquires the VoIP IP/port information at the time of the VoIP call setup (INVITE/SETUP and 200 OK, Call Proceeding) and provides it to the IDS 110, such that corresponding IP packets are differentially applied to intrusion detection in the IDS 110. As a result, the QoS of VoIP that requires real-time processing can be improved.

When the VoIP call is completed (BYE/DISCONNECT), the VoIP ALG 130 sends IP/port information of corresponding VoIP to the IDS 110, indicating that the VoIP call has been completed, such that the IDS 110 can delete corresponding IP/port information from the IP/port list for differential intrusion detection.

A detailed and stepwise description follows of a dynamic network security control method according to an embodiment of the present invention.

Figure 4:
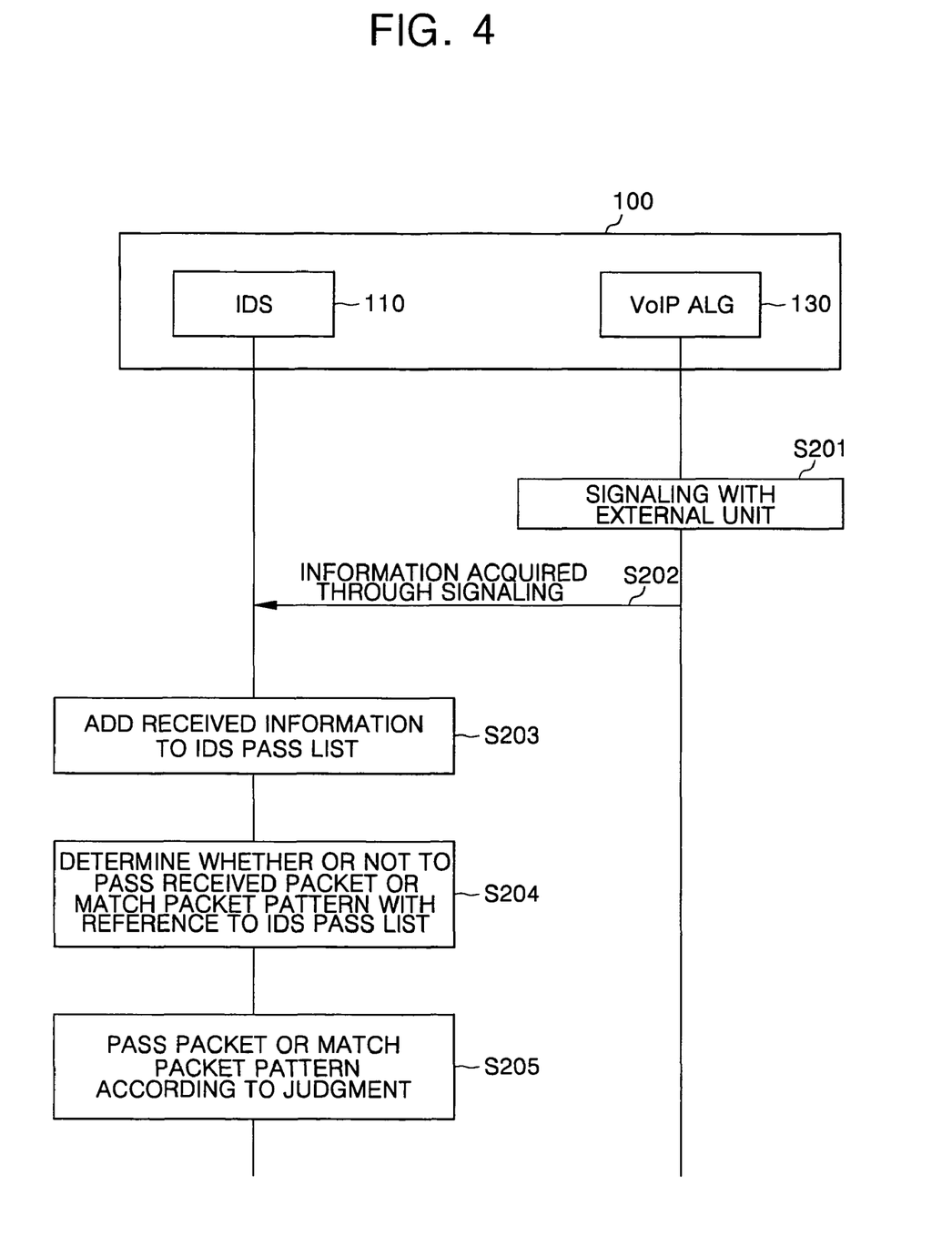
FIG. 4 is a flowchart of a dynamic network security control method according to an embodiment of the present invention.

FIG. 4 is a flowchart of the dynamic network security control method according to an embodiment of the present invention.

As shown in FIG. 4, the VoIP ALG 130 in the router 100 can perform VoIP signaling with an external unit via a VoIP call setup message, and acquires VoIP IP/port information of a corresponding system through VoIP signaling in S201.

After VoIP IP/port information is acquired through VoIP signaling, the VoIP ALG 130 in the router 100 provides acquired VoIP IP/port information to the IDS 110 in order to instruct the IDS 110 not to perform intrusion detection on a packet received from a source unit having the above-acquired VoIP IP/port information in S202. That is, when the VoIP ALG 130 re-generates a signaling payload according to the NAT/PT rule of a VoIP call setup message (e.g., Q931 "Setup" message or SIP "INVITE" message) after signaling scanning with the source unit, it acquires media information of RTP or VoIP IP/port information to transmit to the IP/port check module 113 of the IDS 110, thereby notifying the IP/port check module 113 of local VoIP service information.

Upon receiving VoIP IP/port information for differential intrusion detection provided from the VoIP ALG 130, the IP/port check module 113 of the IDS 110 additionally stores the received IP/port information in the IDS pass list of the IP/port memory 113a in S203.

In S204, the IP/port check module 113 of the IDS 110 determines whether or not to perform intrusion detection on a received packet with reference to the IDS pass list stored in the IP/port memory 113a.

According to the result of the determination, the IP/port check module 113 of the IDS 110 allows passage of the received packet to the firewall 120 without intrusion detection or performs intrusion detection matching (i.e., pattern/byte code matching) on the received packet in S205.

That is, the IP/port check module 113 checks the IDS pass list stored in the IP/port memory 113a to temporarily disable intrusion detection on a packet (e.g., VoIP media stream) received from a source unit having corresponding IP/port information. Then, the packet is passed to the firewall 120 without intrusion detection if it is received from a source unit having IP/port information that is the same as that received from the VoIP ALG 130.

When a VoIP call release message (e.g., Q931 "Disconnect" message, SIP "BYE" message) is received at completion of the VoIP call with the source unit having such IP/port information, the VoIP ALG 130 forwards corresponding RTP IP/port information of the call release message to the IP/port check module 113 of the IDS 110.

Thus, the IP/port check module 113 of the IDS 110 deletes corresponding RTP IP/port information of the received call release message from the IP/port memory 113a so that intrusion detection is performed on all of the packets received from the source unit of corresponding IP/port information since then.

According to the dynamic network security system and the control method thereof according to certain embodiments of the present invention, in a router where an IDS and a VoIP ALG are integrated, the VoIP ALG parses VoIP IP/port information acquired through VoIP signaling to acquire necessary RTP IP/port information, shares acquired RTP IP/port information with the IDS through interlocking so that the IDS performs differential RTP packet pattern matching on a VoIP packet in order to ensure the QoS of the VoIP packet.

In addition, the IDS sets a pattern check rule and gives flexibility to the set pattern check rule in order to skip intrusion detection checking or to enable check packet quantity to be selective (per a predetermined period).

Furthermore, the IDS performs packet pattern matching differentially in order to reduce system load as compared to conventional pattern matching applied to all packets.

Accordingly, dynamic IP/port information is shared in the router where the IDS and the VoIP ALG are integrated, and thus intrusion detection is performed differentially to improve the VoIP QoS and reduce system load, thereby improving system performance.

While the present invention has been shown and described in connection with the exemplary embodiments, it will be apparent to those skilled in the art that modifications and variations can be made without departing from the spirit and scope of the present invention as defined by the appended claims.

What is claimed is:

1. An integrated switching system, comprising:
a switch comprising:
   a Voice over Internet Protocol (VoIP) signaling processing module to perform a VoIP signaling process on VoIP calls to set and cancel the VoIP calls; and
   a VoIP media processing module to transmit and receive a VoIP media packet through the VoIP signaling; and
a router coupled to the switch, the router comprising:
   a VoIP Gateway module to obtain Real-time Transport Protocol (RTP) Internet Protocol (IP)/Port information for a corresponding VoIP call from a VoIP call setup message according to processing signaling for VoIP call setup of the VoIP signaling processing module by interworking with the VoIP signaling processing module, and to provide the obtained RTP IP/Port information for a VoIP media packet having the same RTP IP/Port as the obtained RTP IP/Port information as information for skipping intrusion detection; and
   an intrusion detection module to store the obtained RTP IP/Port information provided from the VoIP Gateway module, and to provide the received VoIP media packet to the VoIP media processing module without performing intrusion detection on the VoIP media packet when a VoIP media packet having the same RTP IP/Port information as the stored RTP IP/Port information is received.

2. The system according to claim 1, wherein the VoIP Gateway module obtains RTP IP/Port information on the corresponding VoIP call from a VoIP call cancellation message through the VoIP signaling processing module when VoIP signaling for cancellation of the VoIP calls is performed, and provides the obtained RTP IP/Port information to the intrusion detection module as information for application of the intrusion detection.

3. The system according to claim 2, wherein the intrusion detection module deletes the RTP IP/Port information for the VoIP calls provided from the VoIP Gateway module when the VoIP calls are cancelled from the information for skipping the stored intrusion detection.

4. The system according to claim 3, wherein the RTP IP/Port information provided from the VoIP Gateway module to the intrusion detection module is provided using an Inter Processor Communication Protocol (IPC Protocol).

5. The system according to claim 4, wherein the intrusion detection module comprises:
   a RTP IP/Port information storage unit to store the RTP IP/Port information for the VoIP calls for skipping the intrusion detection obtained from the VoIP Gateway module through the signaling of the VoIP signaling processing module;
   a RTP IP/Port check module to store the information on the VoIP calls obtained when VoIP calls provided from the VoIP Gateway module are set in the RTP IP/Port storage unit as information for skipping the intrusion detection, to delete the RTP IP/Port information on the VoIP calls obtained when the VoIP calls provided from the VoIP Gateway module are cancelled from the RTP IP/Port information storage unit, to compare the RTP IP/Port information of the received VoIP media packet with the RTP IP/Port information for skipping the intrusion detection stored in the RTP IP/Port storage unit, and to provide information on whether the intrusion detection is applied or not based on the comparison result; and
   an intrusion detector to provide the received VoIP media packet to the VoIP media processing module without performing the intrusion detection on the received VoIP media packet when the RTP IP/Port information of the VoIP media packet received according to the information on whether the intrusion detection provided from the RTP IP/Port check module is applied or not is the same as the RTP IP/Port information for skipping the intrusion detection stored in the RTP IP/Port storage unit.

6. The system according to claim 5, wherein the intrusion detector performs the intrusion detection using pattern or byte code matching set for the received VoIP media packet when the RTP IP/Port information on the received VoIP media packet is not the same as that for skipping the stored intrusion detection.

7. A method of processing a packet in an integrated switching system comprising a Voice over Internet Protocol (VoIP) switch comprising a VoIP signaling processing module and a VoIP media processing module, and a router comprising an Intrusion Detection System (IDS) to perform VoIP Gateway module and intrusion detections, the method comprising:

processing, by the VoIP signaling processing module in the VoIP system, VoIP signaling for setup of VoIP calls;

interworking with, by the VoIP Gateway module, the VoIP signaling processing module obtaining Real-time Transport Protocol (RTP) Internet Protocol (IP)/Port information on the VoIP calls from a signaling message for setup of the VoIP calls, and providing the obtained RTP IP/Port information to the IDS of the router as information for skipping intrusion detection of the VoIP media packet having the same RTP IP/Port information as the obtained RTP IP/Port information;

storing, by the IDS, the RTP IP/Port information for the VoIP calls provided from the VoIP Gateway module as the information for skipping the intrusion detection; and providing, by the IDS, the received VoIP media packet to the VoIP media processing module of the VoIP system without performing intrusion detection on the received VoIP media packet when a VoIP media packet having the same information as the RTP IP/Port information for skipping the stored intrusion detection is received.

8. The method according to claim 7, further comprising obtaining, by the VoIP Gateway module, RTP IP/Port information for the corresponding VoIP calls from a VoIP signaling message of the VoIP signaling processing module when the VoIP calls are cancelled, and providing the obtained RTP IP/Port information to the IDS as information for application of the intrusion detection.

9. The method according to claim 8, further comprising deleting, by the IDS, the RTP IP/Port information obtained when the VoIP calls are cancelled from the information for skipping the stored intrusion detection.

10. The method according to claim 9, wherein the RTP IP/Port information provided from the VoIP Gateway module to the IDS processes a packet provided using an Inter Processor Communication (IPC) protocol and received by the router.

11. The method according to claim 7, further comprising:

providing a VoIP media packet to the VoIP media processing module of the VoIP system;

comparing the RTP IP/Port information on the received VoIP media packet with the RTP IP/Port information for skipping the stored intrusion detection when the VoIP media packet having the stored IP/Port information is received;

providing the received VoIP media packet to the VoIP media processing module without performing the intrusion detection on the received VoIP media packet in a case of a counterpart unit having the same RTP IP/Port in as a result of the comparison; and obtaining, by the VoIP Gateway module, RTP IP/Port information on the VoIP calls when signaling is performed on the VoIP signaling processing module to cancel the VoIP calls, and then deleting the obtained RTP IP/Port information from the information for skipping the intrusion detection.

12. The method according to claim 11, wherein the comparison comprises performing by the IDS, the intrusion detection using pattern or byte code matching set for the received VoIP media packet when the RTP IP/Port information on the received VoIP media packet is not the same as that for skipping the stored intrusion detection.

* * * * *